United States Patent [19]

Waitman et al.

[11] 4,364,968

[45] Dec. 21, 1982

[54] PROCESS FOR PREPARING A DRIED GRAPE PRODUCT

[75] Inventors: Reuben H. Waitman, Pearl River, N.Y.; Bettie M. Frank, West Orange, N.J.

[73] Assignee: General Foods Corporation, White Plains, N.Y.

[21] Appl. No.: 249,544

[22] Filed: Mar. 31, 1981

[51] Int. Cl.³ .................. A23L 1/212; A23B 7/08
[52] U.S. Cl. .................. 426/639; 426/640; 426/658; 426/426
[58] Field of Search .......... 426/302, 321, 331, 639, 426/640, 615, 426, 456, 102, 103, 658

[56] References Cited

U.S. PATENT DOCUMENTS

| | | | |
|---|---|---|---|
| 3,365,309 | 1/1968 | Pader et al. | 426/465 |
| 3,800,049 | 3/1974 | Larroche et al. | 426/639 |
| 3,857,983 | 12/1974 | Roth | 426/481 |
| 3,904,774 | 9/1975 | Dymsza | 426/321 |
| 3,952,112 | 4/1976 | Fulger et al. | 426/615 |

FOREIGN PATENT DOCUMENTS 1021990  12/1977  Canada ........................... 426/302

*Primary Examiner*—Raymond N. Jones
*Assistant Examiner*—George C. Yeung
*Attorney, Agent, or Firm*—Joseph T. Harcarik; Daniel J. Donovan; Thomas R. Savoie

[57] ABSTRACT

A process for preparing dried grapes which are further processed to remain desireably soft with minimal color, flavor, or textural changes over extended periods of time. The process combines the use of enzyme inactivation and a hydrophillic carbohydrate infusion into fresh grapes, followed by drying the grapes to a moisture content of less than 30%. The dry grapes are then converted into simulated raisins by storing the dry grapes for a period of time under controlled humidity and at an elevated temperature effective to provide a darkening in color and to develop a natural raisin-like flavor within the grapes without further drying of the grapes.

4 Claims, No Drawings

PROCESS FOR PREPARING A DRIED GRAPE PRODUCT

DESCRIPTION

Technical Field

The present invention relates to the field of dried fruits, and particularly, to new dried fruit products having improved properties initially and upon storage. More particularly, the invention pertains to new simulated raisin products and process for obtaining the product.

There is a long history of the desirability of and necessity for dried fruit products. Many of these products are simply dried under naturally occurring sunny conditions, such as raisins, and other fruits are dried under controlled industrial conditions to protect the color, flavor and texture of the products. The known commercial processes, however, leave much to be desired in terms of processing and the ability of the products so dried to remain desirably soft over extended periods of time with minimal changes in color and flavor.

The prior art references show techniques for maintaining the softness of raisins by the infusion thereof with humectants such as glycerol. Basically, these references teach that long periods of soaking or cooking at elevated temperature conditions will cause the raisins to be moistened by the glycerol so that the known humectant properties of glycerol can be taken advantage of. Typical of these teachings are U.S. Pat. Nos. 3,952,112; 4,103,035; 4,256,772; 3,595,681; and 2,909,435. Other references teach the retention of softness by various coatings such as fat, humectants like glycerol, and other treatments. Also in the area of treating raisins, a publication by H. R. Bolian appearing in Volume One of the *Journal of Food Science* at page 1316, indicates that heat treatment of raisins can have some effect on the softness of raisins. In the area of treating fresh fruits and vegetables, Food Processing Review No. 2, Dehydration Process for Convenience Foods, by Robert Noyes, pages 174-177 and 255-260 is applicable. Therein, U.S. Pat. No. 3,365,309 discloses treating apples and grapes with a sugar solution. In Volume 9 of the Encyclopedia Britannica, Copyrighted 1957, pages 877-880, a fruit classification system to which this invention is applicable is provided which herein incorporated by reference.

There remains, however, a present need for a process capable of treating fresh fruits so that the dried fruit products retain more of their natural flavor and in the dried condition, remain soft, flavorful and of good color for longer periods of time. There also remains a need in the art for a process which will enable the control of product flavor and texture so that unique variations in the nature of the dried fruit product can be made as desired. And, the resultant product needs to be readily consumable.

SUMMARY OF THE INVENTION

The present invention provides an improved process for preparing dried fruit products and the resulting product of that process. The process comprises the steps of providing a whole or sectioned fruit; immersing the fruit in a solution of a hydrophillic carbohydrate, said solution being of a concentration effective to provide significant osmotic withdrawal of water from the fruit and deposition of the carbohydrate within the cellular structure of the fruit; heating the fruit and carbohydrate for a period of time and at a temperature effective to melt any surface wax and to cause inactivation of any normally-degrading natural enzyme systems present in the fruit; removing excess carbohydrate solution from the fruit; and, drying the fruit to a moisture content of less than 30%. According to a preferred embodiment of the process, fresh grapes are treated in this manner and then further treated by storing at elevated temperatures and controlled humidity for an extended period of time to develop a flavor and color which closely approximates that of a natural raisin.

DISCLOSURE OF THE INVENTION

Currently, fruits are stabilized with acid, sulfur dioxide or sulfite treatments to minimize color change and then allowed to sun dry, air-oven dry, vacuum or freeze dry. Despite these treatments, currently processed fruits still become brown and otherwise lose color, as well as losing their natural fruit flavor, softness and desirable turgidity. The commercially available dried fruits present a undesirable combination of flavor, color, hardness and shriveled appearance after extended periods of storage.

The present invention, on the other hand, can be employed to provide dried fruits of improved storage quality in terms of texture, turgidity, flavor and color. The process can be employed on whole or otherwise sectioned pieces of fruit classified in the dry-fleshy and fleshy fruit types having one or more carpels and within the drupe, pome, berry, inferior berry, and multiple carpel forms. Examples of these include the plum, peach, cherry, apple, pear, quince, tomato, grape, blueberry and pineapple. The aggregate, multiple, Hesperidium, Pepo forms are not suitable for this invention. Examples of these unsuitable fruits are raspberries, strawberries, figs, mulberries, oranges, limes, squash, cucumber, pumpkin and watermelon. Fruits that have already been dried having a moisture content of less than 40%, are not suitable for use in this process. An example to which this invention will not work is raisins.

The processing of many of these different fruits will require conditions specially adapted to the particular flavors and colors associated with these products so that maintenance of the most desirable of these properties can best be obtained and retained over the extended period of time. The following description will be restricted to discussion of those conditions which are particularly suitable for the production of dried grapes. Those of ordinary skill in the art, given the particular conditions and processing steps set forth in this general description as well as in the Examples, will be able to readily adapt the techniques of this invention to the other fruits.

The process of this invention will be less energy intensive than current commercial drying where large energy inputs are required. The present process will preferably be used by fruit processors on fresh fruit and eliminate the need now seen in the prior art for a first drying step prior to a infusion step with a humectant which is often also followed by a drying step, depending upon the particular end use of the dried fruit.

The initial stages of moisture removal, according to this invention, are through osmotic transfer of moisture and solids. The inactivation of enzymes capable of degrading fruit tissue as well as flavor and color, according to this invention, assures better retention of natural properties in the final product. The fact that this particular advantage can be combined within one basic step of heating in the infusion solution, highlights the simplicity and efficiency of the present process. The solids which are added to the inside of the fruit pieces not only make the simulated raisins retain their moisture content better over long periods of storage, but also protect the fruit visually and texturally to more closely approximate the appearance of freshly dried fruit pieces.

As a first step in the process of the present invention, grapes are prepared for processing by stemming, sizing, washing etc., as is desired. One aspect of this invention is that the fruit to be processed does not have to be sectioned or peeled prior to processing where it is of suitable size to assure efficient processing. However, it has been found that when processing fruits that have not been peeled, the resultant product is more wrinkled in appearance. In the particularly preferred embodiment of grapes, the grapes are employed whole and are processed with remarkably good results.

The grapes are then immersed in a solution of a suitable hydrophyllic carbohydrate of sufficient concentration to provide a significant osmotic withdrawal of water from the grape during heating, with deposition of the carbohydrate within the fruit in place of the water which is withdrawn. Among the suitable carbohydrates are those of the polyhydroxy family, such as glycerol, propylene glycol, butylene glycol, corn syrup, dextrose, honey, fructose, high fructose corn syrup, mixtures of these, and the like. Excluded from the group of carbohydrates that are expected to work are the class of crystallizing sugars such as sucrose. Crystallizing sugars are undesirable for this invention because they usually recrystallize within the fruit which destroys the texture, as well, as tends to dry the fruit.

It is noted that for any given application, the selection of carbohydrate must be made with a knowledge of the particular flavor compatibility of the carbohydrate with the product and the knowledge that the osmotic dehydration capabilities of the carbohydrates varies markedly, depending upon the particular combination of conditions, substrate and end use requirements. Thus, the infusing of a particular fruit or even particular type of grape for a particular end use will require a balancing of flavor and functionality to achieve the final selection of the carbohydrate. The preferred carbohydrate for use in the case of Thompson seedless grapes are glycerol, high fructose corn syrups and honey, and combinations of glycerol and high fructose corn syrup or honey.

The concentration of the carbohydrate solution should be as high as economically practical to increase the rate of osmotic dehydration of the grapes, as well as enhance the transfer of carbohydrate as a replacement for the water. Obviously, the greater the concentration difference between the carbohydrate solution and the internal grape carbohydrate content, the greater the rate at which dehydration and infusion will occur. In addition, heating the carbohydrate-grape mixture increase the rate of osmotic dehydration and carbohydrate infusion while shortens the process time. Thus, it is fully within the scope of the present invention to provide a stage-wise or continuous counter-current processing of the grapes.

As with the concentration of the solution of carbohydrate, the particular time and temperature of heating is also largely within the determination of the worker for a particular type of fruit based on the final properties desired. Typical processing conditions for the case of approximately 200 pounds of average sized Thompson seedless grapes, and approximately 200 pounds of a solution of 99% of glycerol and 1% citric acid at a temperature of approximately 200° F. is heating the glycerol mixture and grapes for a period of time necessary in a steam jacketed kettle to bring the temperature from ambient to slightly over approximately 200° F. (approximately 93° C.) as being effective to provide the requisite carbohydrate infusion. This requires approximately five minutes time. This combination of temperature and time can, however, be varied depending upon the final moisture content and carbohydrate content desired in the final product. These concentrations, temperatures and times can be determined by those of ordinary skill in the art, by known techniques.

If desired, the infusion solution of carbohydrate may also bear flavors for simultaneous infusion of these into the fruit structures. These flavors can be employed to either fortify, enhance, or change the nature of the particular fruit flavor involved. For example, where glycerol is employed to infuse grapes, it may be desirable to employ a small percentage, say about 1%, of a food acid such as citric acid, in the infusion solution to provide a somewhat more tart taste to offset the glycerol sweetness. It is thought that the addition of any acidulant would adversely affect the browning reaction occurring between the enzymes and carbohydrates. Also, concentrated raisin juice can be employed if desired as a part of the infusion solution. Thus, the raisin flavor later developed will be more pronounced.

The temperature and the time of heating must be sufficient to cause inactivation of the normally degrading natural enzyme systems, and the like, such as pectinases and the like which could later affect product quality were they not dealt with. It is critical to this invention that the enzymes are inactivated. Otherwise, the enzymes might react with the pectins of the cell walls to produce additional sugars which would enhance the browning reaction and tend to make such reaction uncontrollable. Heating may be employed to provide a controlled degree of Maillard browning and flavor development, but the heating should not be so severe as to cause undesirable product changes. The moisture reduction of the fruit during this phase of processing will typically be in the range of from about 80% to about 50%, preferably less than 40% based on the weight of the wet grapes. This water is replaced in part with the infusion carbohydrate. It is desired that the carbohydrate infused into the fruit be in the range of from about 1:1 to less than 2:1, carbohydrate to moisture present after drying. For example, in the case of grapes processed by this invention, the final moisture will be in the range of from about 5% to 20% and the glycerol content will be from about 10 to 30%, and preferably 10% to 20%.

Such infusions of carbohydrates within the grapes or other fruit add substantially to non-water weight of solids of the fruit. Subsequently, because the fruit cell wall structure changes during the heating step, the water content of the fruits is more readily removed by low or high temperature air or oven drying or by vacuum or freeze-drying processes. This is a distinct advantage of the present invention when it is seen that it can replace the two-stage process for preparing soft-moist raisins as is known in the art: that is, first drying to form the raisins and then infusing and again drying the infused raisins. By employing the procedure of the present invention, only one overt drying process is necessary, and its efficiency is increased significantly. By proper attention to temperatures attained during drying, manipulation of the pH within the fruit, addition or withholding of anti-browning and anti-oxidant materials such as ascorbic acid, citric acid, sulfites and the like, fruits may be selectively held close to their natural colors or allowed to brown and take on other flavor changes. In the preferred embodiment of the invention for the conversion of grapes into simulated raisins, an additional storage or tempering will be required to more fully allow color and flavor development.

The simulated raisins, after being infusion treated, are allowed to temper under conditions effective to establish equilibrium of the solids and solute with the natural cellular constituents. This may desirably be done in a closed vessel. Tempering times of 0 to 10 hours are typically employed with times of up to 48 hours being effective. Preferably 4 to 8 hours will be employed. Tempering is used to allow the carbohydrate to equilibrate throughout the fruit. In the preferred embodiment of grapes, this time allows the water present at the core of the grape to equilibrate throughout the grape with the glycerol. This equilibration subsequently facilitates drying of the grape. If the grapes are not tempered, longer drying times will be required. After tempering, the grapes are desirably drained again of any free infusion solution and surface rinsed with water.

The water washed carbohydrate drained off may be reconcentrated in single or multiple effect evaporators for reuse, with the initial infusion medium as desired. Additional carbohydrates will be required to replace the amount infused into the grapes. One would usually rinse the infused grapes with water before drying. This would facilitate handling of the infused grape. However, if the grapes are to be turned during drying, the rinse may be deleted.

Thereafter, the grapes are preferably dried to reduce their moisture content to the ultimate low level desired. Any of the known conventional drying methods can be employed, such as oven drying, vacuum drying, and the like. Air drying in a warm air oven at a temperature of from about 130° F. to about 180° F. (approximately 54° C. to 82° C.) for a period of time of from about three hours to about 24 hours is effective in reducing the moisture content to a suitable level. Typically, the moisture should be reduced to about less than 30% and, preferably less than 20%. It is noted that while moisture contents of much less than 10% ordinarily provide fruit products which are too hard and chewy to be considered fruitlike in texture, those of the present invention are desirably soft.

The dried grapes are then further treated to develop a raisin color and flavor therein. These simulated raisins can thereafter be employed as substantial equivalents for raisins in products such as raisin bran and granola-type cereals which place heavy demands upon the textural properties of both the cereal and the raisins. To develop this raisin color and flavor, the grapes are stored under controlled humidity at elevated temperatures for extended periods of time which are effective to provide a darkening in color and the development of a natural raisin flavor. The soluble protein of the simulated raisins react with the reducing sugars present within the fruit under conditions effective to cause browning and flavor development. This is typically a Maillard reaction which occurs. Proper humidity control is necessary to effectively control color development. It is preferred that the humidity be saturated. This also enables the prevention of moisture loss during storage. If proper humidity control is not exercised, then the simulated raisins would darken quite rapidly.

The addition of flavors during infusion as discussed previously, such as concentrated raisin juice, can aid in this flavor development. Likewise, the addition of a small amount of food acid also provides a more raisin-like flavor. Typically, to produce the flavor development, the dried grapes are stored under controlled humidity to prevent moisture loss and to control browning reaction by maintaining a temperature of from about 130° F. to about 180° F. (approximately 54° C. to 82° C.) for a period of time necessary to effect the desired developement. Typically at the higher temperatures it can be performed in several hours but at lower temperatures, such development may require several days. These conditions will vary with the level of flavor and color developing materials, e.g., reducing sugars, present in the grapes.

At the end of this processing, the simulated raisins may be treated by coating with vegetable oil, sugar, or other like materials to prevent undue clustering or clumping where the simulated raisins or other dried fruit will be maintained in direct contact with each other for extended periods of time.

It is an advantage of the present invention that the production of a color, texture and flavor controlled simulated raisin is possible from this processing and can be done with free moisture contents as low as 1 to 2% and with water activities between 0.6 and 0.3. It has been found that $A_w$ below 0.6 produces desireable retention of soft moist properties for inclusion into breakfast cereals. Even at these low moistures and water activities, the simulated raisins or other fruits are pleasantly soft. Fruit and fruit pieces processed in this manner can impart desirable flavor and texture contrast when added to processed cereals in ready-to-eat blends or ready-to-cook mixtures as well as offer new potential for admixture to cake, cookie, and pudding mixes, and the like.

Another advantage of the present invention is that fruits prepared by this process may be consumed with no further preparation such as boiling the prepared fruit pieces in water. This provides added convenience to the consumer.

The following examples are presented for the purpose of further illustrating and explaining the present invention and are not to be taken as limiting in any regard. Unless otherwise indicated, all parts and percentages are by weight.

EXAMPLE I

One part of stemmed and graded Thompson seedless grapes containing between 20 and 24% soluble solids are added to a preheated solution of one part of 99% U.S.P. glycerol and 1% citric acid based on the weight of the glycerol. The citric acid is added to reduce the sweet glycerol flavor. The mixture of grapes and glycerol solution is heated in a steam-jacketed kettle to approximately 200° F. (approximately 93° C.), the total heating time taking a period of about 5 minutes. After this time, the glycerol solution is drained from the grapes and the grapes are allowed to equilibrate for a period of about 7 hours in a closed vessel. After the period of equilibration, the grapes are then spread out over screen trays and allowed to drain and are surface rinsed with water at this time. The resulting infused grapes are then air dried in a high velocity air oven for about six hours at a temperature of about 150° F. (approximately 66° C.). At this point, the resultant product had a dried grape flavor and a color and texture of a golden seedless raisin.

EXAMPLE II

According to the preferred embodiment of the invention, dried grapes as prepared in Example I are further treated to produce a fruit product simulating common brown sun dried raisins. The dried grapes are placed into polyethylene bags and sealed. The sealed bags are then stored at a temperature of about 150° F. (approximately 66° C.) for a period of six hours. Heating in the sealed bags or other sealed container in this manner permits effective temperatures for browning and flavor development to be achieved without undue further dehydration. Upon completion of the storage, the grapes have become brown and have a well-developed, natural raisin flavor. The moisture content of the grapes is approximately 16%.

EXAMPLE III

This Example describes the use of the simulated raisins prepared in Example II in preparing an improved raisin bran product by packaging them with bran flakes of conventional formulation. To prevent sticking of the simulated raisins, they are washed with glycerol and centrifuged to remove excess glycerol. The simulated raisins are then coated with 15% fat-coated sugar in a bell reel. The fat-coated sugar was previously prepared by coating granular sucrose with 5% of a hydrogenated vegetable oil. To complete the product, the simulated raisins prepared in this manner are simply added to bran flakes, which were dried to about 3% moisture, by first layering the bran flakes and then sprinkling the simulated raisins thereover prior to conveying the mixture of the two into wax paper lined packages.

EXAMPLE IV

The procedures of Example II was repeated, but 90% high fructose corn syrup was employed in place of the glycerol. After a period of storage of six hours at a temperature of about 150° F. (approximately 66° C.) the resultant product was not as brown in color as those prepared in accordance with Example II, although flavor development was adequate.

The above description has been presented for the purpose of describing the invention to those of ordinary skill in the art. It is not intended that each and every obvious modification and variation of the invention be described in detail. It is intended, however, that all obvious modifications and variations be included within the scope of the invention which is defined by the following claims.

What is claimed is:

1. A process for preparing a dried grape product comprising:
   (a) providing whole or sectioned grapes;
   (b) immersing the grapes into an aqueous hydrophillic carbohydrate solution having a concentration effective to provide significant osmotic withdrawal of water from the grapes and deposition of carbohydrate into the grapes in place of the water said hydrophillic carbohydrate is a member selected from the group consisting of glycerol, propylene glycol, fructose, sorbitol, mannitol, high fructose corn syrup, honey corn syrup, and combinations of these;
   (c) heating the grapes and carbohydrate for a period of time and at a temperature effective to melt surface wax and to cause inactivation of any normally-degrading natural enzymes present in the grapes and to increase the rate of osmotic dehydration and carbohydrate infusion;
   (d) removing excess solution from the surface of the grape;
   (e) drying the grapes to a moisture content of less than 30%; and,
   (f) converting the dry grapes into simulated raisins by storing the grapes obtained after step (e) for a period of time under controlled humidity and at an elevated temperature effective to provide a darkening in color and to develop a natural raisin-like flavor within the grapes without further drying of the grapes.

2. A process according to claim 1 wherein the drying is achieved in a convection oven operated at a temperature of from around 130° F. to about 180° F.

3. A process according to claim 1 wherein the carbohydrate comprises glycerol and the infusion solution contains an amount of an acid effective to reduce the sweet taste imparted by the glycerol.

4. The product produced by the process of claim 1.

* * * * *